| United States Patent [19] | [11] Patent Number: 4,896,357 |
| --- | --- |
| Hatano et al. | [45] Date of Patent: Jan. 23, 1990 |

[54] INDUSTRIAL PLAYBACK ROBOT HAVING A TEACHING MODE IN WHICH TEACHING DATA ARE GIVEN BY SPEECH

[75] Inventors: Yasukichi Hatano; Yoshimasa Itoh; Yoshiyuki Hirose, all of Yokohama; Kazuyuki Miyamae; Yuichi Ishikawa, both of Kawasaki, all of Japan

[73] Assignee: Tokico Ltd., Japan

[21] Appl. No.: 72,884

[22] Filed: Jul. 14, 1987

Related U.S. Application Data

[63] Continuation-in-part of Ser. No. 28,760, Mar. 23, 1987, abandoned.

[30] Foreign Application Priority Data

Apr. 9, 1986 [JP] Japan .................................. 61-81857
Jul. 16, 1986 [JP] Japan ................................. 61-167143
Jul. 18, 1986 [JP] Japan ................................. 61-169397

[51] Int. Cl.⁴ .......................... G10L 7/08; B25J 9/00
[52] U.S. Cl. ........................................... 381/43; 901/3
[58] Field of Search ............................... 381/41–46; 364/513, 513.5; 367/198; 901/1–5

[56] References Cited

U.S. PATENT DOCUMENTS

| 3,946,157 | 3/1976 | Dreyfus | 381/43 |
| 4,187,454 | 2/1980 | Ito et al. | 901/4 |
| 4,420,812 | 12/1983 | Ito et al. | 364/513 |
| 4,462,080 | 7/1984 | Johnston et al. | 364/513.5 |
| 4,624,008 | 11/1986 | Vensko et al. | 364/513.5 |
| 4,641,292 | 2/1987 | Tunnel et al. | 381/43 |
| 4,717,364 | 1/1988 | Furukawa | 367/198 |

FOREIGN PATENT DOCUMENTS

3139431 10/1981 Fed. Rep. of Germany.

OTHER PUBLICATIONS

Götz, "Steuerungen für Indusrteroboter", Der Elektroniker, May 1984, pp. 62–65.
Dillmann et al., "Spracherkennung und-Synthese Bei Robotern", Elektronik, Oct. 1985, pp. 169–175.

Primary Examiner—David L. Clark
Assistant Examiner—John A. Merecki
Attorney, Agent, or Firm—Andrus, Sceales, Starke & Sawall

[57] ABSTRACT

An industrial playback robot having a teaching mode and a playback mode comprises a robot structure, a speech discriminating circuit for detecting an instruction from an input speech in the teaching mode, and a control board for controlling the movement and operation of the robot structure. The control board stores information about the position and operation of the robot structure in the teaching mode and controls the movement and operation of the robot structure depending on the stored information in the playback mode.

7 Claims, 4 Drawing Sheets

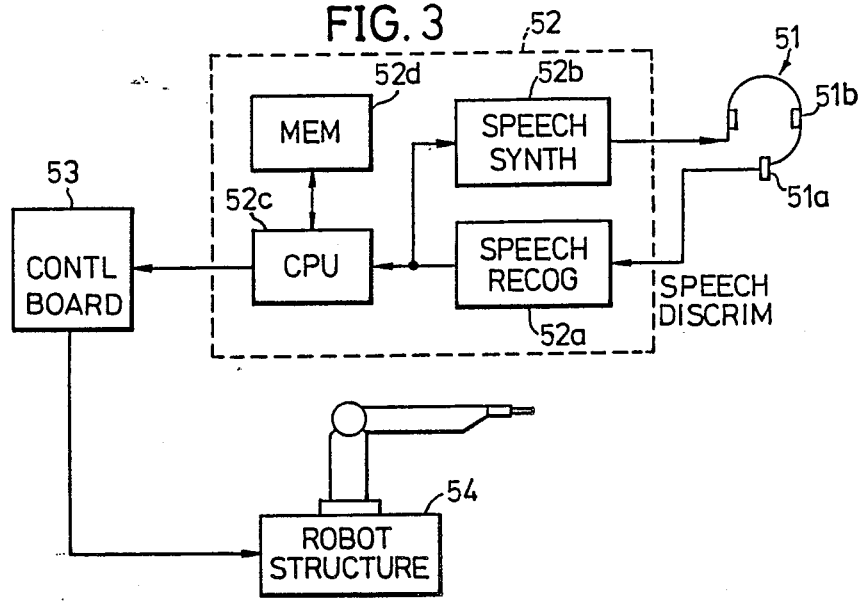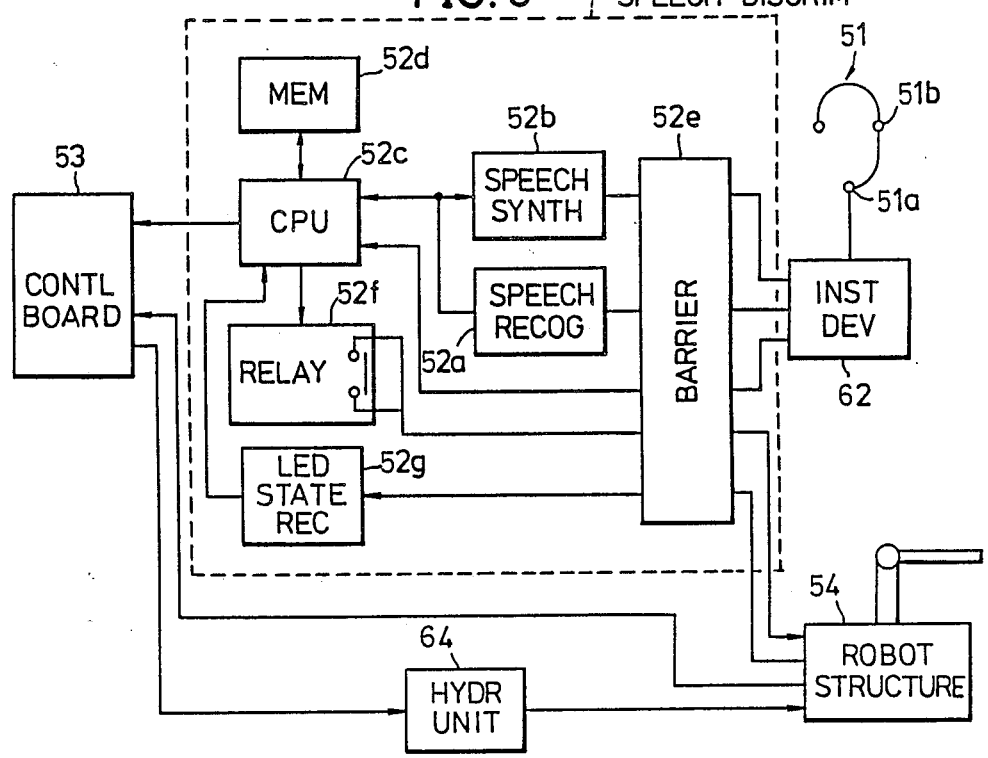

INDUSTRIAL PLAYBACK ROBOT HAVING A TEACHING MODE IN WHICH TEACHING DATA ARE GIVEN BY SPEECH

BACKGROUND OF THE INVENTION

The present application is a Continuation-In-Part Application of a U.S. patent application Ser. No. 028,760 entitled "INDUSTRIAL PLAYBACK ROBOT" filed Mar. 23, 1987, abandoned.

The present invention generally relates to industrial playback robots designed to play back operations based on teaching data which are entered into the robot beforehand, and more particularly to an industrial playback robot which can be taught with ease.

When teaching an industrial playback robot, the teaching operation may be carried out either according to the point to point (hereinafter simply referred to as PTP) control (or sequential positioning control) which teaches discrete operating points to the robot or according to the continuous path (hereinafter simply referred to as CP) control which continuously teaches operating points to the robot. However, according to the CP control, position data related to the operating points are continuously stored into a memory means and this memory means must thus have a large memory capacity. On the other hand, according to the PTP control, only position data related to predetermined operating points need to be stored into the memory means, and for this reason, the required memory capacity of the memory means is greatly reduced compared to the case where the CP control is employed.

But according to the PTP control, it is impossible to teach the robot by use of a teaching handle which is connected to an articulated arm of the robot in a case where the robot is to carry out operations within a small space such as inside a vehicle. In this case, a first operator manually moves a movable part (for example, an arm) of the robot, and a second operator manipulates a teaching switch to store a teaching datum such as a position datum of an operating point into the memory means when the movable part reaches a teaching position.

In other words, in the conventional industrial playback robot employing the PTP control, at least two operators are required to carry out the teaching. In a teaching mode, the movable part of the robot is freely movable, and it is essential that the first operator supports and moves the movable part while the second operator enters the teaching datum by manipulating the teaching switch. As a result, the conventional industrial playback robot employing the PTP control suffers a disadvantage in that the teaching efficiency is poor.

It is possible to conceive a teaching handle provided with switches for entering predetermined teaching data. However, there are various kinds of teaching data such as data indicating positions where the operation of the robot is to start and end. If the number of switches provided on the teaching handle were to be increased depending on the number of kinds of teaching data, there is a disadvantage in that the construction and wiring of the teaching handle become extremely complex. Furthermore, the number of kinds of teaching data which can be entered becomes limited by the number of switches which can be provided on the teaching handle.

In addition, depending on the shape of the robot and the location of the robot, there are cases where it is impossible to use the teaching handle, as described before. In such cases, the conventional industrial playback robot employing the PTP control can only enter the teaching datum by the two operators.

On the other hand, as methods of teaching the robot, there is the direct teaching method in which the robot is taught manually by the operator and the indirect teaching in which the robot is taught by remote control. In the case of the indirect teaching, keys on an instruction panel must be manipulated in order to instruct which movable part of the robot is to move and in which direction the designated movable part of the robot is to move. Such an instruction is made for each movable part of the robot so that the robot moves to a predetermined operating point or takes a predetermined position.

For example, an articulated robot comprises one shaft about which an arm moves to the right and left, two shafts about which the arm moves back and forth, three shafts about which the arm moves up and down, four shafts about which a wrist moves up and down, five shafts about which the wrist moves to the right and left, and six shafts about which the wrist rotates to the right and left. The part of the robot to be moved may be designated by designating the shaft, and the moving direction in which the designated part is to move or rotate may be designated by designating the rotating direction about the designated shaft. In this case, the designation of the shaft and the designation of the moving direction are made by manipulating appropriate ones of twelve keys which are provided on the instruction panel for each shaft and each moving direction, or by manipulating rotary switches.

In other words, in order to carry out the indirect teaching with respect to the conventional industrial robot, the operator must manipulate appropriate ones of a plurality of keys provided on the instruction panel. For this reason, the selection of the appropriate keys becomes troublesome and difficult for the operator as the number of control elements (that is, shafts and moving directions) of the articulated robot increases, and there is a problem in that the operation efficiency of the teaching operation is poor.

In addition, the teaching data for the robot change depending on the kind of work piece, and the number of kinds of work pieces is usually in the order of several tens. Hence, when carrying out the playback operation, the operator must select appropriate teaching data for the kind of work piece. Conventionally, the operator visually discriminates the kind of work piece and selects the appropriate teaching data by manipulating a switch on an operation panel located within a hazardous location, for example.

Accordingly, the operator must walk to the operation panel to manipulate an appropriate switch when selecting the appropriate teaching data, and the operator must discontinue whatever he is doing when making the selection. Hence, there is a problem in that the operation efficiency of the playback operation is poor.

On the other hand, in the case where the robot is a painting robot and the operation panel must have an explosion-proof construction, an explosion-proof box or a safety circuit such as a barrier is required. Therefore, it is difficult to increase the number of switches on the operation panel without increasing the cost considerably, and it is thus difficult to increase the number of kinds of teaching data for the selection by the operator.

SUMMARY OF THE INVENTION

Accordingly, it is a general object of the present invention to provide a novel and useful industrial playback robot in which the disadvantages described heretofore are eliminated.

Another and more specific object of the present invention is to provide an industrial playback robot which comprises speech discriminating means for discriminating the kind of teaching datum from a speech input, and the teaching datum is stored into a memory means as a teaching datum of the kind discriminated by the speech discriminating means. According to the industrial playback robot of the present invention, the teaching of the robot can be carried out by one operator. In addition, it is possible to carry out the teaching satisfactorily regardless of the shape of the robot and the location of the robot.

Another and more specific object of the present invention is to provide an industrial playback robot comprising a robot structure for carrying out an operation on a work piece, speech discriminating means for recognizing a speech input, and control means for selecting teaching data in correspondence with the kind of work piece responsive to an output of the speech discriminating means and for controlling the operation of the robot structure based on the selected teaching data during a playback operation. According to the industrial playback robot of the present invention, the selection of the teaching data during the playback operation is carried out responsive to the speech input. Hence, the operator can continue whatever he is doing and simultaneously give the next instruction to the robot. In other words, the operator can select the kind of teaching data by a remote control by speech. In addition, instead of providing a plurality of switches on the operation panel for the selection of the teaching data, it is simply necessary to provide a microphone for receiving the speech input. For this reason, it is possible to easily increase the number of kinds of teaching data for the selection by the operator without the need to provide additional switches, signal lines, barriers and the like, and the operation efficiency of the playback operation is improved.

Still another object of the present invention is to provide an industrial playback robot comprising a main articulated robot body for carrying out an operation on a work piece, speech discriminating means for recognizing a speech input, and an instruction device having switching means for operating predetermined movable parts of the robot structure a predetermined quantity based on an output of the speech discriminating means for teaching operating points of the robot structure during a teaching operation. According to the industrial playback robot of the present invention, the designation of the part of the main robot to be moved and the designation of the moving direction of the designated part during the teaching operation are carried out responsive to the speech input. Hence, it is possible to considerably reduce the number of keys which must be manipulated during the teaching operation compared to the conventional industrial robot, and the operation efficiency of the teaching operation is improved.

Other objects and further features of the present invention will be apparent from the following detailed description when read in conjunction with the accompanying drawings.

BRIEF DESCRIPTION OF THE DRAWINGS

FIG.3 is a system block diagram for explaining a second embodiment of the industrial playback robot according to the present invention;

FIG.5 is a system block diagram for explaining a third embodiment of the industrial playback robot according to the present invention.

DETAILED DESCRIPTION

Figure 1:
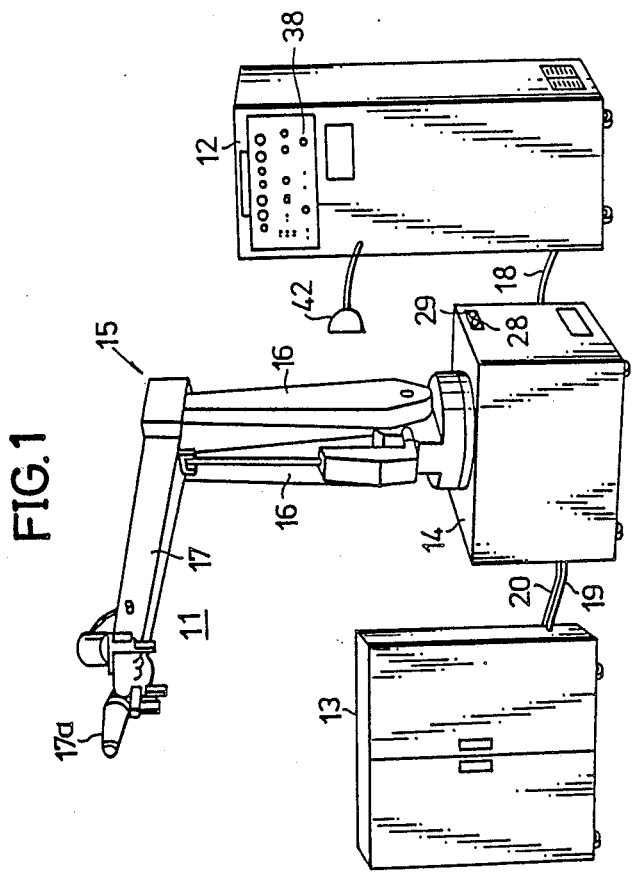
FIG.1 shows the general construction of a first embodiment of the industrial playback robot according to the present invention.

Description will be given with respect to a first embodiment of the industrial playback robot according to the present invention. As shown in FIG.1, the robot generally comprises a robot structure 11, a control board 12 and a driving source 13. In the present embodiment, a hydraulic power unit is used as the driving source 13, but the driving source 13 is not limited to the hydraulic power unit. For example, a pneumatic power unit and an electrical power source may be used as the driving source 13.

The robot structure 11 comprises a base 14, and a movable part 15 provided on the base 14. The movable part 15 is constituted by a swingable columnar body 16 and an arm 17. A spray gun 17a is provided on a tip end of the arm 17. The robot structure 11 is electrically coupled to the control board 12 via an electrical cable 18. In addition, the robot structure 12 is electrically coupled to the driving source 13 via an electrical cable 19 and is also coupled to the driving source 13 via a pipe arrangement 20. In the present embodiment, it will be assumed for convenience' sake that the robot is a painting robot for painting a work.

Figure 2:
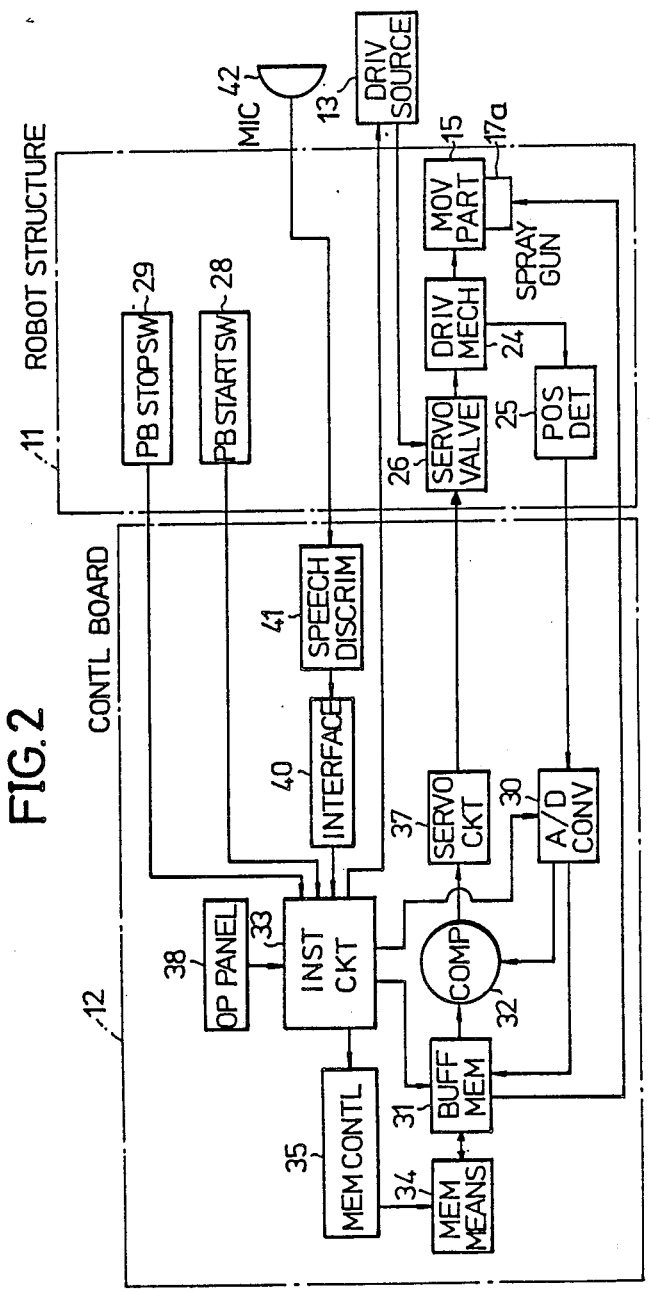
FIG.2 is a system block diagram showing the robot shown in FIG.1.

As may be seen from FIG.2, the spray gun 17a is controlled by a spray signal outputted from a buffer memory 31 which will be described later. A position detector 25 comprising a potentiometer or the like is coupled to a driving mechanism 24 which drives the movable part 15. In the present embodiment, a hydraulic cylinder is used as the driving mechanism 24. However, a pneumatic cylinder, an electrically driven cylinder, a rotary actuator or any combination of such may be used as the driving mechanism 24. The position detector 25 detects the displacement of the driving mechanism (hydraulic cylinder) 24 and produces an analog position signal. This position signal is supplied to an analog-to-digital (A/D) converting circuit 30 within the control board 12. On the other hand, a servo valve 26 is used to introduce the oil pressure from the driving source 13 to the driving mechanism 24. The servo valve 26 is controlled responsive to a signal from a servo circuit 37 within the control board 12 so that an appropriate oil pressure is supplied to the driving mechanism 24. The necessity to provide the servo valve 26 of course depends on the kind of driving source 13 and driving mechanism 24 employed.

As shown in FIG.1, a playback start switch 28 for starting playback and a playback stop switch 29 for stopping the playback are provided on a side wall of the base 14, for example, at a position outside of the space in which the movable part 15 undergoes displacement.

Description will now be given with respect to the control board 12. The A/D converting circuit 30 converts the analog position signal from the position detector 25 into a digital position signal. In a teaching mode, the digital position signal is supplied to the buffer memory 31 as a teaching datum, and in the playback mode, the digital position signal is supplied to a comparing circuit 32 as a feedback signal. The selective supply of the digital position signal to either the buffer memory 31 or the comparing circuit 32 depending on the operation mode is controlled responsive to a control signal from an instruction circuit (main control circuit) 33. As will be described later, a sampling clock signal for the A/D converting circuit 30 is also obtained from the instruction circuit 33.

The buffer memory 31 temporarily stores the teaching datum from the A/D converter 30 before storing the teaching datum into a memory means 34. The buffer memory 31 also temporarily stores the teaching datum read out from the memory means 34 as a position instruction datum and supplies the position instruction datum to the comparing circuit 32. A magnetic disc, a magnetic tape, a semiconductor memory and the like may be used as the memory means 34. The write-in and read-out operations to and from the memory means 34 are controlled by a memory means control circuit 35. In other words, in the teaching mode, the memory means control circuit 35 carries out a control so as to write the temporarily stored teaching datum in the buffer memory 31 into the memory means 34 responsive to an instruction from the instruction circuit 33. On the other hand, in the playback mode, the memory means control circuit 35 carries out a control so as to read the stored teaching datum out of the memory means 34, temporarily store the read out teaching datum into the buffer memory 31 as the position instruction datum and supply the position instruction datum to the comparing circuit 32.

The comparing circuit 32 compares the feedback signal from the A/D converting circuit 30 indicative of the present position of the movable part 15 with the position instruction datum described above, and supplies an error signal to the servo circuit 37. The servo circuit 37 amplifies the error signal and produces a signal for controlling a solenoid (not shown) of the servo valve 26, so that an appropriate oil pressure is supplied to the driving mechanism 24 and the movable part 15 is moved to a position instructed by the position instruction datum.

As described before, the instruction circuit 33 controls the memory means control circuit 35 so as to control the data transfer between the buffer memory 31 and the memory means 34. In addition, the instruction circuit 33 controls the A/D converting circuit 30 so that the digital position signal is supplied to the buffer memory 31 in the teaching mode and is supplied to the comparing circuit 32 in the playback mode. The instruction circuit 33 varies the period of the sampling clock signal supplied to the A/D converting circuit 30 and controls the moving speed of the movable part 15. The period of the sampling clock signal is controlled by manipulating a knob (not shown) provided on an operation panel 38.

The instruction circuit 33 further controls the driving source 24. In other words, when a mode selection switch (not shown) provided on the operation panel 38 is manipulated to set the operation mode to the teaching mode, the instruction circuit 33 controls the driving source 24 so that no oil pressure is supplied to the servo valve 26. On the other hand, when the mode selection switch is manipulated to set the operation mode to the playback mode, the instruction circuit 33 controls the driving source 24 so as to supply the oil pressure to the servo valve 26. As a result, the movable part 15 is freely movable in the teaching mode and is driven in the playback mode.

The instruction circuit 33 is coupled to a speech discriminating circuit 41 via an interface 40. The speech discriminating circuit 41 amplifies an audio signal from a microphone 42 and discriminates the kind of teaching datum from the audio signal. For example, the microphone 42 is detachably provided on a helmet or the like worn by the operator and detects speech such as "point", "start spray", "stop spray" and "end" generated by the operator. The speech discriminating circuit 41 compares the incoming audio signal with a prestored speech pattern, and recognizes and discriminates the speech input to determine the kind of teaching datum. The discrimination result indicative of the kind of teaching datum is supplied to the instruction circuit 33 via the interface 40.

In a case where the speech "point" is detected, the speech discriminating circuit 41 discriminates that the teaching datum simply relates to a position datum. Thus, the instruction circuit 33 controls the A/D converting circuit 30 so that the digital position signal outputted from the A/D converting circuit 30 is temporarily stored in the buffer memory 31 as a teaching datum related to the position datum. In a case where the speech "start spray" or "stop spray" is detected, the speech discriminating circuit 41 discriminates that the teaching datum relates to a position datum and a datum for starting or stopping the spraying of paint. Hence, the instruction circuit 33 controls the A/D converting circuit 30 so that the digital position signal outputted from the A/D converting circuit 30 is temporarily stored in the buffer memory 31 as a teaching datum related to the starting or stopping the spraying of paint. Furthermore, in a case where the speech "end" is detected, the speech discriminating circuit 41 discriminates that the teaching datum relates to an end datum. Accordingly, the instruction circuit 33 controls the A/D converting circuit 30 so that the digital position signal outputted from the A/D converting circuit 30 is temporarily stored in the buffer memory 31 as a teaching datum related to the end datum.

At each of teaching points between the two teaching points where the spraying of paint is to start and stop, a spray signal is supplied from the buffer memory 31 to the spray gun 17a in the playback mode so as to carry out a painting operation. In order to confirm that the speech generated by the operator is positively detected by the microphone 42 and the speech discriminating circuit 41, it is possible to take measures so that an indication is made when the audio signal of the generated speech is received by the speech discriminating circuit 41. In this case, the teaching operation can be carried out with a high reliability.

Next, description will be given with respect to the subject matter of the present invention, that is, the operation of the robot in the teaching mode. The operation of the robot in the playback mode is essentially the same as that of the conventional robot, and description thereof will be omitted in the present specification. For example, the operation of the robot in the playback mode may be readily understood from a U.S. Pat. No. 4,187,454 the assignee of which is the same as the assignee of the present application. In the playback mode, the driving mechanism 24 is controlled based on the data read out from the memory means 34.

In order to carry out the teaching operation, the mode selection switch on the operation panel 38 is set to the "teaching" position so as to set the operation mode to the teaching mode. As a result, no oil pressure is supplied to the servo valve 26 and the movable part 15 becomes freely movable. However, the movable part 15 and the driving mechanism 24 remain coupled to each other. In addition, the instruction circuit 33 creates a teaching state by supplying the output digital position signal of the A/D converting circuit 30 to the buffer memory 31. When the operator manually moves the movable part 15, the driving mechanism 24 moves, and the displacement of the movable part 15 is detected by the position detector 25 which is linked to and moves with the driving mechanism 24. The analog position signal from the position detector 25 is supplied to the A/D converting circuit 30. The A/D converting circuit 30 converts the analog position signal into the digital position signal responsive to the sampling clock signal from the instruction circuit 33, and supplies the digital position signal to the buffer memory 31.

In this state, when the operator generates the speech "point", this speech is detected by the microphone 42 and is discriminated by the speech discriminating circuit 41. The speech discriminating circuit 41 supplies the discrimination result to the instruction circuit 33 via the interface 40. The instruction circuit 33 instructs the buffer memory 31 to enter and temporarily store the digital position signal as a teaching datum related to the position datum of the teaching point. The position data of the teaching points are successively stored into the buffer memory 31, and is transferred and stored into the memory means 34 at an appropriate timing.

When the operator generates the speech "start spray" at the starting point where the painting operation is to start and generates the speech "stop spray" at the stopping point where the painting operation is to stop, signals corresponding to such speech are supplied to the instruction circuit 33 via the interface 40. As a result, the position datum and the datum for starting the spraying of paint, and the position datum and the datum for stopping the spraying of paint are taught to the robot. The position datum and the end datum are taught to the robot when the operator generates the speech "end" at the end of the teaching operation.

In the embodiment described heretofore, the potentiometer is used as the position detector 25. However, it is possible to use a resolver, a rotary encoder, a differential transformer, or any combination of such as the position detector 25.

The kinds of teaching data are not limited to those of the described embodiment. In the case of the painting robot, it is possible to discriminate the changing of the color of paint, the tone of painting and the like from the teaching data. Similarly, in the case of a robot for applying an adhesive agent to a work, it is possible to discriminate the thickness of the adhesive agent to be applied and the like from the teaching data, and further, in the case of a robot having a clamping function, it is possible to discriminate the clamping force and the like from the teaching data. In other words, the kinds of teaching data to be discriminated may be easily changed and added accordingly to the needs by appropriately modifying the construction (or software) of the speech discriminating means. The speech from which the kind of teaching datum is to be discriminated can similarly be set arbitrarily.

In addition, the microphone 42 may be provided at any position where the speech generated by the operator is detectable, such as in a vicinity of the robot structure 11.

As described heretofore, the industrial playback robot according to the present embodiment is provided with the speech discriminating means for discriminating the speech input, and the teaching point (position datum) is entered as the teaching datum of the kind discriminated by the speech discriminating means. The teaching point can be entered by one operator who moves the movable part of the robot and simultaneously generates speech to identify the kind of teaching datum. As a result, the teaching efficiency is improved and an accurate teaching can be carried out because only one operator is required to carry out the teaching operation. Therefore, the present embodiment is especially effective when teaching a robot which has an articulated arm and is to be used within a small space such as inside a vehicle. In other words, according to the present embodiment, it is possible to easily and accurately enter various teaching data regardless of the shape of the robot and the location of the robot.

FIG.3 shows a second embodiment of the industrial playback robot according to the present invention. In FIG.3, a head set 51 integrally comprises a microphone 51a and a headphone 51b and is detachably mounted on a helmet (not shown) worn by an operator (not shown), for example. The head set 51 is electrically coupled to a speech discriminating apparatus 52. The speech discriminating apparatus 52 comprises a speech recognition part 52a, a speech synthesis part 52b, a central processing unit (CPU) 52c, and a speech memory 52d. The microphone 51a is coupled to the speech recognition part 52a, while the headphone 51b is coupled to the speech synthesis part 52b.

The speech recognition part 52a amplifies a speech input received via the microphone 51a and analyzes the speech input so as to obtain a certain speech pattern of the speech input. A plurality of speech patterns corresponding to the kinds of work pieces are pre-stored in an internal memory (not shown) of the speech recognition part 52a. The speech recognition part 52a compares the certain speech pattern with the pre-stored speech patterns within the internal memory thereof, and finds the pre-stored speech pattern which coincides with the certain speech pattern. The pre-stored speech pattern which coincides with the certain speech pattern obtained in the speech recognition part 52a is supplied to the CPU 12c. The speech memory 52d is backed up by a battery (not shown) and pre-stores data used for producing speech for each of the pre-stored speech patterns in the speech recognition part 52a. The CPU 52c reads out from the speech memory 52d a datum corresponding to the pre-stored speech pattern supplied from the speech recognition part 52a, and supplies the read out datum to the speech synthesis part 52b which converts this datum into an audio signal of a speech identical to the speech input and feeds back this audio signal to the headphone 51b to provide the so-called talk-back.

Figure 4:
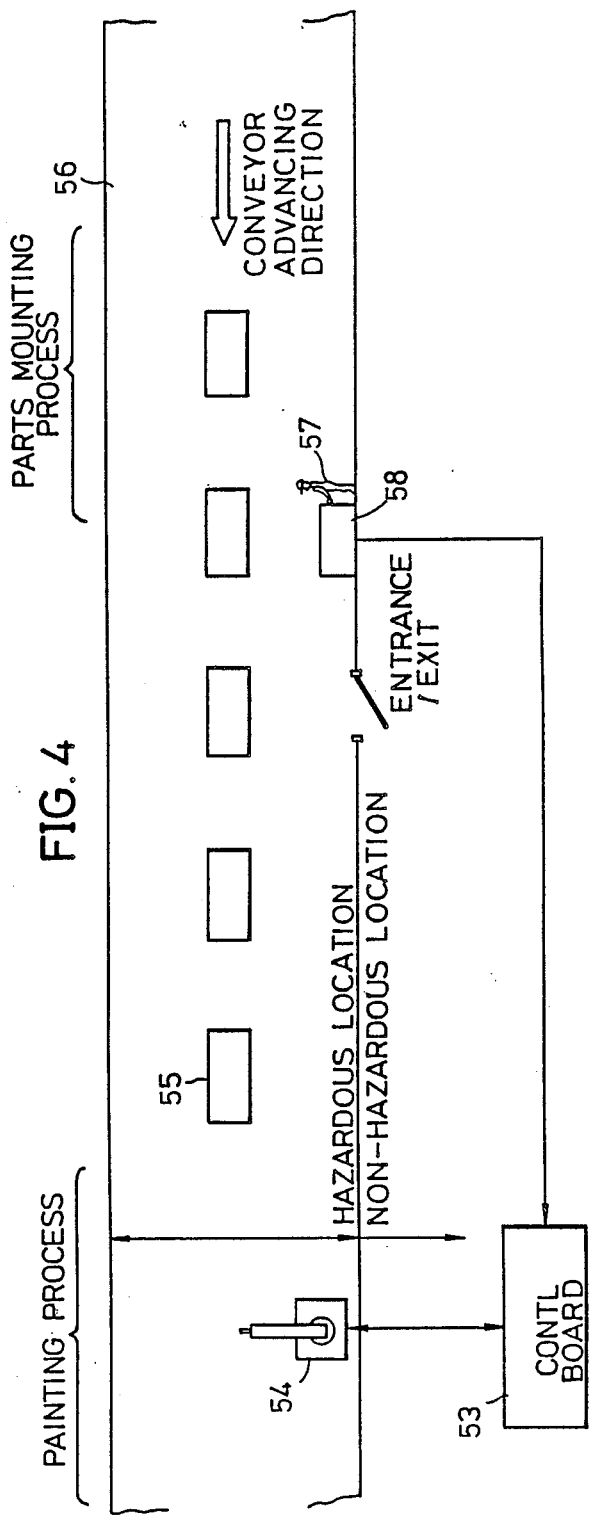
FIG.4 is a general plan view showing the positional relationship between a conveyed work piece and the second embodiment of the industrial playback robot shown in FIG.3.

The speech pattern obtained as a result of the speech recognition in the speech recognition part 52a is encoded in the CPU 52c and is supplied to a control board 53 as a discrimination result. The control board 53 has an internal memory (not shown) which pre-stores a plurality of kinds of teaching data in correspondence with the kinds of work pieces. Hence, appropriate teaching data are read out from the internal memory of the control board 53 depending on the discrimination result, and the operation of a robot structure 54 is controlled based on the read out teaching data. Accordingly, the robot structure 54 carries out an operation such as a painting operation with respect to each work piece 55 which is conveyed on a conveyor as shown in FIG.4. In FIG.3, the illustration of a hydraulic unit for driving the robot structure 54 is omitted for convenience' sake.

In FIG.4, each work piece 55 which is conveyed within a booth 56 is mounted with parts on an upstream side of the conveyor and is painted on a downstream side of the conveyor. An operator 57 carries out operations such as designating the kind of work piece 55 and designating the color of the paint at an operation panel 58 within the booth 56. In the present embodiment, the inside of the booth 56 is a hazardous location due to the spray gas of the paint and the like. Accordingly, the operation panel 58 has an explosion-proof construction and employs a safety circuit. On the other hand, the control board 53 is located outside the booth 56, that is, at a non-hazardous location, and it is unnecessary to make the control board 53 explosion-proof.

During the playback operation, the operator 57 visually discriminates the kind of work piece 55 which is conveyed on the conveyor, and speaks "work 11" or "work 21", for example, to indicate that the kind of work piece 55 is work piece number eleven or work piece number twenty-one. The speech made by the operator 57 is received by the microphone 51a as the speech input, and the discrimination result obtained by the speech recognition described before is encoded and supplied to the control board 53 from the CPU 52c. Hence, the control board 53 reads out from the internal memory thereof the teaching data for the designated work piece 55, and controls the operation of the robot structure 54 based on the read out teaching data.

In the present embodiment, the datum read out from the speech memory 52d and corresponding to the speech pattern obtained by the speech recognition in the speech recognition part 52a is supplied to the speech synthesis part 52b and the talk-back is made to the headphone 51b of the head set 51. Hence, it is possible to audibly confirm the discrimination result to provide a danger protecting function.

According to the present embodiment, the operator can select the appropriate teaching data during the playback operation by speech, without discontinuing whatever he is doing, by providing the speech discriminating apparatus which recognizes the speech input and the control board which selects the appropriate teaching data based on the output of the speech discriminating apparatus. As a result, it is possible to improve the operation efficiency of the playback operation.

In addition, instead of providing a plurality of switches on the operation panel for the selection of the teaching data, it is simply necessary to provide a microphone for receiving the speech input. For this reason, it is possible to easily increase the number of kinds of teaching data for the selection by the operator without the need to provide additional switches, signal lines, barriers and the like, and the operation efficiency of the playback operation is improved also from this point of view.

Next, a description will be given on a second embodiment of the industrial playback robot according to the present invention by referring to FIG.5. In FIG.5, those parts which are the same as those corresponding parts in FIG.3 are designated by the same reference numerals, and a description thereof will be omitted.

Figure 6:
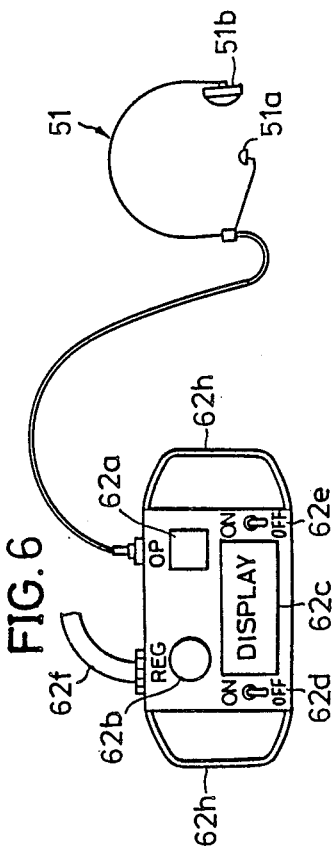
FIG.6 is a front view showing an embodiment of an instruction device shown in FIG.5.

In FIG.5, an instruction device 62 is used for teaching the robot structure 54 in the teaching mode. The instruction device 62 has a construction shown in FIG.6, for example, and comprises an operation switch 62a for instructing the operation of the robot structure 54, a register switch 62b for registering (storing) an operating point which is to be taught, a display part 62c for displaying data which are entered by the speech input, an ON/OFF switch 62d for instructing the ON/OFF of the spraying of paint, and a power switch 62e. The head set 51 is electrically coupled to the instruction device 62, and a cord 62f from the instruction device 62 is coupled to the speech discriminating apparatus 52 for carrying out data transmission therebetween. Handles 62h are provided on both sides of the instruction device 62. Since the instruction device 62 is used near the robot structure 54 within the hazardous location, the instruction device 62 has an explosion-proof construction.

The microphone 51a is coupled to the speech recognition part 52a via the instruction device 62 and a barrier 52e of the speech discriminating apparatus 52. On the other hand, the headphone 51b is coupled to the speech synthesis part 52b via the instruction device 62 and the barrier 52e.

The speech recognition part 52a amplifies an speech input received via the microphone 51a and analyzes the speech input so as to obtain a specific speech pattern of the speech input. A plurality of speech patterns corresponding to the kinds of operations (movements) of the robot structure 54 are pre-stored in the internal memory of the speech recognition part 52a. The speech recognition part 52a compares the specific speech pattern with the pre-stored speech patterns within the internal memory thereof, and finds the pre-stored speech pattern which coincides with the specific speech pattern. The pre-stored speech pattern which coincides with the specific speech pattern obtained in the speech recognition part 52a is supplied to the CPU 52c. The speech memory 52d is backed up by the battery and pre-stores data used for producing speech for each of the pre-stored speech patterns in the speech recognition part 52a. The CPU 52c reads out from the speech memory 52d a datum corresponding to the pre-stored speech pattern supplied from the speech recognition part 52a, and supplies the read out datum to the speech synthesis part 52b which converts this datum into an audio signal of a speech identical to the speech input and feeds back this audio signal to the headphone 11b to provide the so-called talk-back.

The speech pattern obtained as a result of the speech recognition in the speech recognition part 52a is encoded in the CPU 52c and is supplied to a control board 53 as a discrimination result. The control board 53 has the internal memory which pre-stores a plurality of kinds of operation data (instructions) in correspondence with the kinds of operations of the robot structure 54. Hence, appropriate operation data are read out from the internal memory of the control board 53 depending on the discrimination result, and the operation of the robot structure 54 is controlled based on the read out instruction.

A relay circuit 52f is used to control the ON/OFF state of a light emitting diode (LED, not shown) which is mounted on a tip end of an arm of the robot structure 54 for indicating a state in which the teaching operation can be carried out. A signal from the robot structure 54 indicating the ON/OFF state of the LED is supplied to an LED state receiving circuit 52g via the barrier 52e, and is further supplied to the CPU 52c from the LED state receiving circuit 52g. The relay circuit 52f and the LED state receiving circuit 52g are used when the operator carries out a direct teaching with respect to the robot structure 54. In the present embodiment, the speech discriminating apparatus 52 comprises in addition to the elements shown in FIG.3 the barrier 52e, the relay circuit 52f and the LED state receiving circuit 52g.

The control board 53 controls a hydraulic unit 54 for driving a movable part (shaft) of the robot structure 54 designated by the control data (instructions) from the CPU 52c, that is, designated by the discrimination result of the speech recognition. Hence, the designated movable part of the robot structure 54 is moved in the designated direction.

During the teaching operation, the operator speaks "arm up" or "wrist left", for example, to indicate that the arm of the robot structure 54 is to move up and the wrist of the robot structure 54 is to move to the left. The speech made by the operator is received by the microphone 51a as the speech input, and the speech recognition described before is carried out. The datum read out from the speech memory 52d and correspond the speech pattern obtained by the speech recognition in the speech recognition part 52a is supplied to the speech synthesis part 52b and the talk-back is made to the headphone 51b of the head set 51. Hence, it is possible to audibly confirm the discrimination result to provide a danger protecting function.

When the operator audibly confirms the speech recognition which is made through the talk-back and pushes the operation switch 62a of the instruction device 62, the designated movable part (shaft) of the robot structure 54 is moved in the designated direction by the operation of the control board 53 described before. The designated movable part of the robot structure 54 continues to move in the designated direction while the operation switch 62a is pushed. The operator releases the operation switch 62a when the designated movable part of the robot structure 54 moves to a predetermined position, and then pushes the register switch 62b so as to register and teach the predetermined position as an operating point.

Similarly thereafter, the teaching operation is carried out by repeating the operations of designating the movable part of the robot structure 54 and designating the moving direction by speech, controlling the start and stop of the movement of the designated movable part of the robot structure 54 by the operation switch 62a, and registering the position of the designated movable part of the robot structure 54 by the register switch 62b. The ON/OFF switch 62d may be turned ON or OFF for instructing the ON/OFF of the spraying of paint at the operating point which is being registered.

According to the present embodiment, both the designation of the movable part of the robot structure to be moved and the designation of the moving direction are made by the speech input. However, it is also possible to designate only the movable part of the robot structure such as the arm and designate the moving direction by switches. For example, it is necessary to provide on the instruction device eight switches for respectively designating the up and down directions, right and left directions, front and rear directions, and rotating directions of the wrist.

The present embodiment is described for the case where the teaching operation is carried out by the remote control from the instruction device. However, the present embodiment is also applicable to a case where the pre-stored control data are to be modified or corrected. In this case, it is necessary to additionally provide on the instruction device switches for moving the designated movable part of the robot structure back and forth between the operating points.

Furthermore, in the present embodiment, only the designation of the movable part of the robot structure and the designation of the moving direction are made by the speech, but it is also possible to make other instructions by speech such as the ON/OFF state of the spraying of paint and the start and stop of the movement of the designated movable part of the robot structure.

According to the present embodiment, the instruction for the robot structure are carried out by speech during the teaching operation. Hence, it is possible to considerably reduce the number of keys which must be manipulated during the teaching operation compared to the conventional industrial robot, there is no need for the operator to monitor a display on the operation panel during the teaching operation, and the operator simply needs to watch the robot structure which is being taught. Therefore, the teaching operation can be carried out smoothly and the operation efficiency of the teaching operation is improved. In addition, since the number of keys required for the teaching operation is reduced, it is possible to reduce the corresponding number of barriers in the case where the robot is used at a hazardous location and accordingly reduce the overall size of the robot.

Further, the present invention is not limited to these embodiments, but various variations and modifications may be made without departing from the scope of the present invention.

What is claimed is:

1. An industrial playback robot having a teaching mode and a playback mode and comprising:
   mode selecting means for putting said industrial playback robot in one of said teaching mode and said playback mode;
   a robot structure for carrying out one or more operations, and having a movable part;
   driving means for driving said movable part;
   position detecting means for detecting a position of said movable part and for producing positional information indicative of the position of said movable part;
   speech input means for receiving a speech input indicative of an instruction, said instruction being a positioning instruction or an operating instruction corresponding to one of of said one or more operations;
   first memory means for pre-storing speech patterns corresponding to said positioning instruction and to said operating instruction;
   speech recognition means for analyzing the speech input supplied via said speech input means to obtain a certain speech pattern from the speech input, and for comparing said certain speech pattern with the pre-stored speech patterns in said first memory means to recognize said instruction corresponding to said speech input;

speech synthesis part coupled to said speech recognition means for generating a speech signal representative of a speech having said certain speech pattern;

speech output means supplied with said speech signal for sounding said speech having said certain speech pattern so as to confirm the instruction recognized by said speech recognition means;

second memory means for storing teaching data, said teaching data comprising a position datum indicative of a position which is to be assumed by said movable part in said playback mode and an operation datum indicative of an operation which is to be carried out by said robot structure in said playback mode; and control means coupled to said position detecting means, said speech recognition means and said second memory means, said control means in said teaching mode controlling said second memory means so that said positional information detected by the position detecting means is stored in said second memory means as the position datum when said speech input means receives said positioning instruction and that both of said operating instruction and said positional information detected by the position detecting means are respectively stored in said second memory means as the operation datum and the position datum when said speech input means receives said operating instruction, said control means in said playback mode reading out teaching data previously stored in said second memory means during said teaching mode, and controlling said robot structure and said driving means so that said movable part assumes a position corresponding to said position datum and said robot structure carries out an operation corresponding to said operation datum depending on the teaching data read out from said second memory means.

2. An industrial playback robot as claimed in claim 1 which further comprises a barrier, and said speech input means and said speech output means are electrically coupled to said speech recognition means and said speech synthesis part, respectively via said barrier.

3. An industrial playback robot as claimed in claim 1 in which said control means comprises a buffer memory coupled to said second memory means, for temporarily storing said positional information supplied from said position detecting means and said operating instruction recognized by said speech recognition means in said teaching mode, and for temporarily storing the teaching data read out from said second memory means in said playback mode.

4. An industrial playback robot as claimed in claim 1 in which said operating instructions include a first instruction starting a duration of working of said robot structure and a second instruction stopping said duration of working, and wherein said second memory means is further defined as storing said first and second instructions together with positional informations of positions at which said first and second instructions are to be effected.

5. An industrial playback robot having a teaching mode and a playback mode and comprising:

mode selecting means for putting said industrial playback robot in one of said teaching mode and said playback mode;

a robot structure for carrying out an operation on a work piece, and having a plurality of movable parts;

driving means for driving said plurality of movable parts;

position detecting means for detecting respective positions of said plurality of movable parts and for producing a positional information corresponding to the positions of said plurality of movable parts;

speech input means for receiving a speech input indicative of one of a plurality of instructions which respectively relates to said plurality of movable parts;

first memory means for pre-storing speech patterns corresponding to said instructions;

speech recognition means for analyzing the speech input supplied via said speech input means to obtain a certain speech pattern from the speech input, and for comparing said certain speech pattern with the pre-stored speech patterns in said first memory means to recognize said instruction corresponding to said speech input;

speech synthesis part coupled to said speech recognition means for generating a speech signal representative of a speech having said certain speech pattern;

speech output means supplied with said speech signal for sounding said speech having said certain speech pattern so as to confirm the instruction recognized by said speech recognition means;

second memory means for storing teaching data, said teaching data comprising position data indicative of positions which are to be assumed by said plurality of movable parts in said playback mode and an operation datum indicative of said operation which is to be carried out by said robot structure in said playback mode; and manually operated instructing signal generating means for generating a driving signal, an operation signal and a registration signal; and control means coupled to said driving means, said position detecting means, said speech recognition means, said second memory means and said instructing signal generating means, said control means in said teaching mode controlling said driving means to drive a movable part corresponding to said instruction when said driving signal is supplied to said control means, said control means in said teaching mode controlling said memory means so that said positional information detected by the position detecting means is stored in said second memory means as the position datum when said registration signal is supplied to said control means and that said operation datum is stored when said operation signal is supplied to said control means, said control means in said playback mode reading out teaching data previously stored in said second memory means during said teaching mode, and controlling said robot structure and said driving means so that said movable parts assume a position corresponding to said position datum and said robot structure carries out the operation corresponding to said operation datum depending on the teaching data read out from said second memory means.

6. An industrial playback robot as claimed in claim 5 in which said speech input means and said speech output means are electrically coupled to said speech recognition means and said speech synthesis part, respectively via said instructing signal generating means.

7. An industrial playback robot as claimed in claim 6 in which said instructing signal generating means has an explosion-proof construction, said industrial playback robot further comprises a barrier, and said instructing signal generating means is electrically coupled to said speech recognition means and said speech synthesis part via said barrier.

* * * * *